H. P. RESTON.
PULLEY.
APPLICATION FILED AUG. 28, 1911.

1,076,605. Patented Oct. 21, 1913.

Witnesses,
Chas. G. Johannesmeyer
Samuel S. Carr.

Henry P. Reston, Inventor.
By Robert S. Carr.
Atty.

UNITED STATES PATENT OFFICE.

HENRY P. RESTON, OF OAKLEY, OHIO, ASSIGNOR TO THE CINCINNATI PLANER COMPANY, OF OAKLEY, OHIO, A CORPORATION OF OHIO.

PULLEY.

1,076,605.  Specification of Letters Patent.  Patented Oct. 21, 1913.

Application filed August 28, 1911. Serial No. 646,463.

*To all whom it may concern:*

Be it known that I, HENRY P. RESTON, a citizen of England, residing at Oakley, Ohio, have invented a new and useful Improvement in Pulleys, of which the following is a specification.

Figure 1:
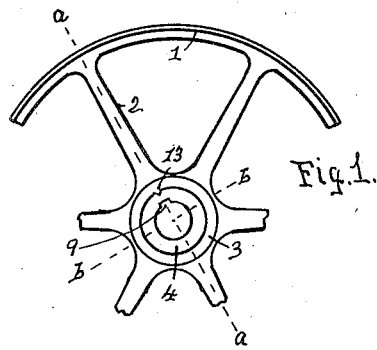
Figure 2:
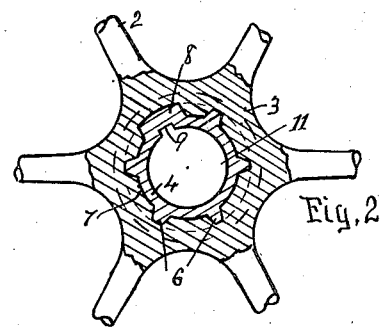
Figure 3:
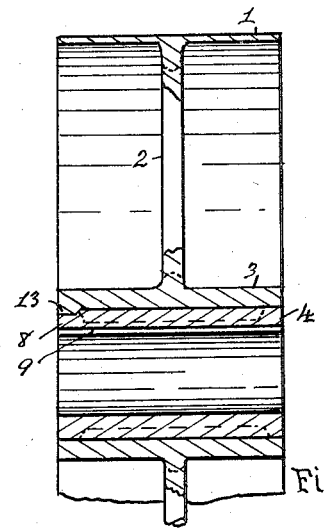
Figure 4:
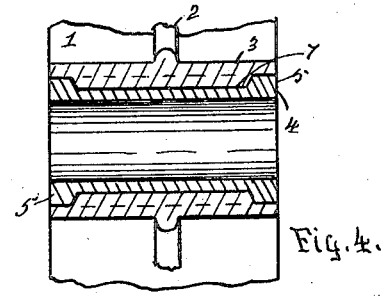

My invention relates to pulleys, and the objects of my improvement are to construct a pulley of light metal—as aluminum—with a bushing of hard metal—as cast iron; to form the bushing with a series of peripheral recesses for engaging with lugs formed within the hub of the pulley for permanently securing it therein; to provide the bushing on one side with an enlarged portion adapted to receive a key seat or set screws for securing the pulley on a shaft; to provide means for indicating the location of said enlarged portion after it is concealed within the hub of the pulley. These objects are attained in the following described manner as illustrated in the accompanying drawings, in which:

Figure 1 is an end elevation of a pulley embodying my improvements; Fig. 2 a transverse section through the hub thereof; Figs. 3 and 4 longitudinal sections respectively on the lines *a—a* and *b—b* of Fig. 1.

In the drawings, 1 represents the rim, 2 the arms and 3 the hub of a pulley which consists of aluminum or other suitable soft light metal and which may be formed by being cast in a mold around the bushing 4 which consists of cast iron or other suitable hard metal. Said bushing is formed cylindrical with annular flanges 5 on its respective ends and with a series of longitudinal ribs 6 corresponding in number with the arms 2. Said ribs extend between the flanges and form peripheral recesses 7 in the face of the bushing. One of said ribs 8 is formed sufficiently wide and heavy to permit a key seat 9 to be formed thereunder within the bore 11 for securing the pulley on a shaft. A longitudinal notch 13 formed in the edge of one of the flanges 5 in registration with the heavy rib 8 serves to indicate the location of said rib after the bushing is secured within the hub of the pulley and faced off in the usual manner.

In construction the bushing is heated then placed in the mold with the ribs thereon in registration with the arms and while hot the pulley is cast around it that they may shrink proportionately in cooling. As a pulley of soft metal cannot be securely keyed to a shaft, the hard metal bushing is provided for that purpose, the lugs within the hub of the pulley by engaging with the respective recesses in the face of the bushing serve to permanently secure them together. By placing the bushing with its ribs in registration with the arms where the metal in the hub is the heaviest serves to prevent any cracking of the hub by contraction in cooling.

While the drawings and description have been confined to pulleys it is evident that my invention may be applied to wheels other than pulleys, whether they are intended to be permanently secured on shafts or to turn idly thereon, as the hard metal bushing in loose wheels or pulleys will materially lessen the wear within their bore.

Having fully described my improvements what I claim as my invention and desire to secure by Letters Patent of the United States is:

An article of manufacture consisting of a hard metal bushing provided with an internal key way and with flanges about its ends between which extend integral parallel ribs one of which is in radial alinement with said key way and wider than the others, and a spoked pulley of lighter metal cast upon said bushing with its spokes in radial alinement with the ribs upon the bushing, the ends of the hub of the pulley being flush with the ends of the bushing, all substantially as and for the purpose set forth.

HENRY P. RESTON.

Witnesses:
CHAS. G. JOHANNESMEYER,
R. S. CARR.